United States Patent Office 3,116,312
Patented Dec. 31, 1963

3,116,312
SUBSTITUTED-2-CYANOACETANILIDES
Robert G. Shepherd, New City, N.Y., and Gunnar S. Redin, Cambridge, England, assignors to American Cyanamid Company, New York, N.Y., a corporation of Maine
No Drawing. Filed Mar. 31, 1960, Ser. No. 18,886
6 Claims. (Cl. 260—465)

This invention relates to substituted lower alkyl-2-cyanoacetanilides and their use in new compositions for the treatment of tuberculosis.

In the past, it is well known that Streptomycin, para-amino salicylic acid and isoniazid have been used in the treatment of human tuberculosis.

We have now found that a new group of compounds are highly active in this field and useful for the same purposes. These compounds can be illustrated by the following general formula:

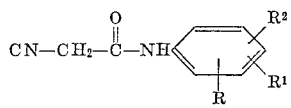

in which R is hydrogen or a lower alkyl radical, $R^1$ is hydrogen, halogen, lower alkyl or a trihalomethyl radical, $R^2$ is hydrogen, halogen or a hydroxy radical.

One of the more difficult aspects of treating human tuberculosis is the propensity of the infecting organism to develop resistance to chemotherapeutic drugs and antibiotics. It is well known that this development of resistance or "drug fastness" has long constituted a principal difficulty in treating human tuberculosis. As a consequence of this characteristic of the tuberculosis organism, to develop resistance, a demand is especially present for new effective drug in this field, to be used alone, in combination therapy with other drugs or as one of a series of drugs used in a course of treatment.

The compounds of the present invention are active against experimental human strain tuberculosis in mice. Furthermore, the chemical structures of these compounds are distinct from the drugs heretofore found effective against tuberculosis and should be particularly useful in treating resistant tuberculosis and also in combination therapy which is widely used in this field.

In testing the compounds of the present invention for anti TB activity the organism used in the test is *Mycobacterium tuberculosis* (H37RV). The test animals are white female mice. The test animals are infected with the disease by administration intravenously of 0.2 ml. of a buffered saline suspension containing approximately 1.5 mg./ml., net weight, of a 12 or 13 day culture of the test organism grown on solid Sauton's medium composed of: 0.05 gm. iron ammonium citrate; 0.5 gm. potassium hydrogen phosphate; 0.5 gm. magnesium sulfate; 2.0 gm. citric acid; 4.0 gm. asparagine; 35.0 gm. glycerine; Dist. water q.s. 1000 ml.; 978 ml. Sauton's; 20 ml. Azolectin sol'n. (130 mg. azolectin purified in 20 ml. ether add 20 ml. warm dist. water and remove ether); 2 ml. Tween 60 (0.4 mg. percent=4 mg./l. of medium. add 2 ml. of solution containing 2mg./ml.).

During a one year experience with this test, the standard infection defined above caused a 99.5% mortality, in that 756 of the 760 infected untreated control mice died within 30 days, the normal period of the test.

Routinely, each week 260 mice are given the standard infection and then segregated in a random manner into cages each of which holds five mice. Four of the resulting groups are retained as untreated controls, and the remaining 48 groups are used to ascertain drug activity.

Drug treatment is administered orally as follows: A measured amount of the compound to be tested (ordinarily 0.4% on a weight/weight basis) is mixed with the feed, and the test animals are allowed to feed at will. The animals are allowed to feed at will for 14 days from the time of infection—the controls, of course, on untreated feed, and the other animals on feed to which compounds on test have been added. All surviving animals are then allowed to feed at will on untreated feed for the remainder of the 30 day test period.

A compound is judged active if on two tests it either saves 2 or more of the 5 mice in the test group, or prolongs average survival time by 4 or more days, compared to untreated controls.

A more rigorous test is continued over a period of 60 days. The test animals may feed for 0–14 days or alternately for a period of 7–14 days from the time of infection. And, alternately, the compound under test may be administered by oral tubing or subcutaneously.

The following table summarizes the relative activity of the various compounds tested compared to p-aminosalicylic acid (as 100%) based on the minimum quantities of compounds tested to give the same response shown by p-aminosalicylic acid.

TABLE I

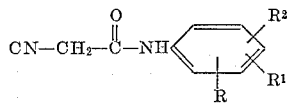

| Compound | R | $R^1$ | $R^2$ | Relative Activity, percent |
|---|---|---|---|---|
| 1 | H | H | H | 200 |
| 2 | H | (2) Cl | H | 200 |
| 3 | H | (3) Cl | H | 200 |
| 4 | H | (4) Cl | H | 100 |
| 5 | H | (2) Br | H | 50 |
| 6 | H | (3) Br | H | 200 |
| 7 | H | (4) Br | H | 100 |
| 8 | H | (2) I | H | 100 |
| 9 | H | (3) I | H | 100 |
| 10 | H | (4) I | H | 200 |
| 11 | H | (2) F | H | 200 |
| 12 | H | (3) F | H | 200 |
| 13 | H | (4) F | H | 200 |
| 14 | H | (2) Cl | (3) Cl | 200 |
| 15 | H | (2) Cl | (4) Cl | 400 |
| 16 | H | (2) Cl | (5) Cl | 200 |
| 17 | H | (3) Cl | (5) Cl | 200 |
| 18 | H | (3) Cl | (4) Cl | 200 |
| 19 | H | (2) Br | (6) Br | 50 |
| 20 | H | (2) F | (4) F | 200 |

TABLE I—Continued $$CN-CH_2-\overset{O}{\underset{\|}{C}}-NH-\text{(phenyl with } R, R^1, R^2\text{)}$$

| Compound | R | R¹ | R² | Relative Activity, percent |
|---|---|---|---|---|
| 21 | H | (3) F | (5) F | 400 |
| 22 | (2) Me | H | H | 200 |
| 23 | (3) Me | H | H | 50 |
| 24 | (4) Me | H | H | 50 |
| 25 | (2) Me | (3) Me | H | 200 |
| 26 | (2) Me | (4) Me | H | 50 |
| 27 | (2) Me | (5) Me | H | 100 |
| 28 | (2) Me | (6) Me | H | 50 |
| 29 | (3) Me | (4) Me | H | 50 |
| 30 | (3) Me | (5) Me | H | 50 |
| 31 | (4) Me | (2) Cl | H | 50 |
| 32 | (5) Me | (2) Cl | H | 400 |
| 33 | (6) Me | (2) Cl | H | 50 |
| 34 | (2) Me | (3) Cl | H | 800 |
| 35 | (4) Me | (3) Cl | H | 50 |
| 36 | (6) Me | (3) Cl | H | 800 |
| 37 | (2) Me | (4) Cl | H | 200 |
| 38 | (2) Me | (5) Br | H | |
| 39 | (2) Me | (5) F | H | 200 |
| 40 | (2) Me | (4) F | H | 200 |
| 41 | (4) Me | (2) F | H | 200 |
| 42 | (2) Me | (4) Me | (3) Cl | 50 |
| 43 | H | (2) CF₃ | H | 50 |
| 44 | H | (3) CF₃ | H | 200 |
| 45 | H | 5CF₃ | (2) Cl | 50 |
| 46 | (2) SCH₃ | H | H | 50 |
| 47 | (3) COCH₃ | H | H | 100 |
| 48 | (3) SO₂NH₂ | H | H | 50 |
| 49 | (4) SO₂NH₂ | H | H | 50 |
| 50 | (4) SO₂NH₂ | (2) Me | (5) Cl | 50 |
| 51 | (3) NO₂ | H | H | 200 |
| 52 | (5) NO₂ | (2) Me | H | 200 |
| 53 | H | (2) OMe | H | 100 |
| 54 | H | (3) OMe | H | 50 |
| 55 | H | (4) OMe | H | 50 |
| 56 | CNCHCONH—(phenyl) <br> \|<br> CH₃ | | | 50 |

The compounds of this invention may be prepared by several general methods such as I. Condensation of an α-cyanoacetic acid ester, acid amide, or the like with an aniline. This condensation has been carried out in the following specific ways. (A) A cyano acid ester is condensed with an aniline with removal from the reaction mixture of the co-formed alcohol. This method is illustrated by Example I hereinafter. (B) The condensation, with an α-cyano acid, is carried out by use of phosphorus trichloride as described by [Grimmel et al., J.A.C.S. 68, p. 539 (1946)]. The reaction ordinarily proceeds with formation of an intermediate phosphazo compound, followed by reaction of the intermediate phosphazo compound with the α-cyano acid to form the anilide. Using this method however, it is usually not necessary to isolate the intermediate phosphazo compound, and the three reactants (the α-cyano acid, the aniline, and the phosphorus trichloride) are mixed together, and, after the two-step reaction is substantially complete, the desired anilide is recovered from the reaction mixture. This method is further illustrated by Example II hereinafter. (C) Alternately, instead of an excess of the aniline, as illustrated in B., above, a different acid acceptor may be used to neutralize the hydrochloric acid formed in the first step: Here, also, the two-step reaction is ordinarily carried out in one operation, without isolation of the intermediate phosphazo compound. This method is illustrated by Examples III, VII, VIII, IX, XI and XIII hereinafter. (D) The condensation may also be effected by use of phosphorus pentachloride as described by [Schroeter et al., J. Prak. Chem., 105, p. 171]. Here, an intermediate acid chloride is formed, which intermediate acid chloride is then reacted with an aniline to form the desired anilide product. (Here again either an excess of aniline or a different acid acceptor may be used to neutralize the co-formed hydrochloric acid.) Ordinarily, by this technique, it is desirable to isolate the intermediate acid chloride. This method is further illustrated by Example V hereinafter. (E) Tetraethyl pyrophosphite may be used as a condensing agent as described by [Anderson et al., J.A.C.S. 74, p. 5309 (1952)]. This method is further illustrated by Example IV hereinafter. (F) An α-cyano-acid amide may be condensed with an aniline salt by the method described by A. Galat et al., J.A.C.S. 65, p. 1566 (1943). This method is further illustrated by Example VI hereinafter. (G) The compounds of the present invention can be prepared by reacting a phenylisocyanate with an acetonitrile. A diester chlorophosphite may also be used as a condensing agent, forming an intermediate mixed anhydride [Anderson et al., J.A.C.S. 74, p. 5307 (1952)].

The compounds of the present invention prepared by the methods described above can be for example:

5'-chloro-2-chloro-2'-acetotoluidide;
4'-chloro-2-cyano-2'-acetotoluidide;
3'-chloro-2-cyano-2'-acetotoluidide;
4'5'-dichloro-2-cyano-2'-acetotoluidide;
3'4'-dichloro-2-cyano-2'-acetotoluidide;
5'-bromo-2-cyano-2'-acetotoluidide;
4'-bromo-2-cyano-2'-acetotoluidide;
3'-bromo-2-cyano-2'-acetotoluidide;
4'5'-dibromo-2-cyano-2'-acetotoluidide;
3'4'-dibromo-2-cyano-2'-acetotoluidide;
5'-fluoro-2-cyano-2'-acetotoluidide;
4'-fluoro-2-cyano-2'-acetotoluidide;
3'-fluoro-2-cyano-2'-acetotoluidide;
4'5'-difluoro-2-cyano-2'-acetotoluidide;
3'4'-difluoro-2-cyano-2'-acetotoluidide;
5'-trichloromethyl-2-cyano-2'-acetotoluidide;
4'-trichloromethyl-2-cyano-2'-acetotoluidide;

5'-tribromomethyl-2-cyano-2'-acetotoluidide;
5'-trifluoromethyl-2-cyano-2'-acetotoluidide;
5'-methyl-2-cyano-2'-acetotoluidide;
4'-methyl-2-cyano-2'-acetotoluidide;
5'-chloro-4'-methyl-2-cyano-2'-acetotoluidide;
5'-chloro-4'-bromo-3'-methyl-2-cyano-2'-acetotoluidide
and the like.

The new medicinal compositions of this invention comprises dosage units of substituted lower alkyl 2-cyanoacetanilides such as described above. Some of these compounds are new. Others have been described in the chemical literature. Methods of preparing these compounds are described in the examples hereinafter. As stated hereinbefore the compositions of the present invention may be employed as the sole therapeutic or in combination with other materials, for example, paraamino salicyclic acid.

A dosage unit of substituted -2-cyanoacetanilides for an adult patient comprises from about 10 mg./kg./day to 1000 mg./kg./day of active ingredient. A dosage unit for optimum results would be from about 50 to about 400 mg./kg./per day of the substituted -2-cyanoacetanilide in the treatment of tubercle bacilli infections, such dosage units are employed in such a manner that a total of from about 4 to 30 gms. of active ingredient for an adult patient of about 150 lbs. are administered orally in a 24 hour period. In children, the daily intake of substituted -2-cyanoacetanilides may be reduced so that from about 5 to about 400 mg. per pound of body weight are administered in a 24 hour period. Such daily administration of dosage units can be for as long a period as desired although as previously pointed out, drug resistance strains of tubercular bacilli tend to develop and it is usually advantageous to discontinue treatment after a few weeks. Treatment can then be continued as desired after a period of time in which other effective drugs are used.

A preferred dosage unit form is a tablet which for an adult would preferably contain from about ½ to about 4 grams of drug and for children, from about 100 to about 800 mg. of drug. Larger tablets can, of course, be used and if desired scored to be broken into dosage units or a number of smaller tablets adapted to be taken at one time will constitute a satisfactory dosage unit. A further preferred dosage unit form is a capsule which may contain a similar amount of active ingredient along with the necessary fillers or diluents. Other dosage forms well known to the pharmaceutical industry can be used in like manner.

The dosage units of drug may contain other inert or medically active materials for instance when the dosage unit form is a tablet, pill or granules, there may also be present various binders, fillers or solid diluents. Suitable materials for this purpose may be for example starch, such as corn starch or sugar such as lactose or succrose. There may also be present various medically active materials for example, p-amino salicylic acid. When the dosage unit form is a capsule, it may contain in addition to materials of the above type a liquid carrier such as fatty oil. The dosage unit form may also have present various flavors, oil or wintergreen and excipients such as dicalcium phosphate. Various other materials may be present as coatings or to otherwise modify the physical form of the dosage unit, for instance, pills or capsules may be coated with shellac, sugar or both. Of course, any material used in preparing the dosage unit form must be pharmaceutically pure and substantially nontoxic in the amounts employed.

The following examples describe the preparation of respective substituted lower alkyl-2-cyanoacetanilides of the present invention.

*Example I*

PREPARATION OF 3'-CHLORO-2-CYANO-2'-ACETOTOLUIDIDE (3'-CHLORO-2'-METHYL-2-CYANOACETANILIDE)

A mixture of 70.7 g. (0.50 moles) 3-chloro-o-toluidine redistilled boiling point 110–112°, 65 ml. (67 g., 0.59 mole) ethyl cyanoacetate is heated to reflux so that a slow but steady distillation of ethanol occurs. In 1 hour 28.5 ml. of distillate, boiling point 77–78° C., is obtained (98% of theory of ethanol). The mixture has turned dark and the hot melt is poured into a 500 ml. Erlenmeyer flask where it started to crystallize. To the mixture is added 50 ml. of xylene and then 100 ml. of petroleum ether (90–100° C.), and the mixture cooled and filtered. The dark solid is digested with 100 ml. of boiling methanol for 15 minutes, breaking up the lumps with a spatula, and cooling to 15° C. and filtering. The first crop after drying to constant weight amounts to 65.6 g. of yellow crystals, melting point 176–179°. A second crop of 14.3 g., melting point 172–176° is obtained from the methanolic filtrate after treating with about 15 g. of activated charcoal and concentrating. Total yield is 79.9 g. (77% of theory).

*Example II*

PREPARATION OF 5'-CHLORO-2-CYANO-2'-ACETOTOLUIDIDE (5'-CHLORO-2'-METHYL-2-CYANOACETANILIDE)

A solution of phosphorus trichloride (1.3 ml.) in 10 ml. of 1,4-dioxane is added slowly to a cold stirred solution of 5-chloro-2-methylaniline (10.1 g.) and cyanoacetic acid (2.5 g.) in 50 ml. of 1,4-dioxane. A crystalline precipitate forms immediately. The mixture is warmed at about 90° C. for 1 hour, the crystalline solid filtered, washed three times with 50 ml. portions of hot dioxane and oven-dried at 50° C. to yield 6.9 g. (90%) 5-chloro-2-methyl-aniline hydrochloride, subliming at 241–243° C. (corr.). The filtrate and washings are combined, heated to boiling and 150 ml. of hot water added to the cloud point. Upon cooling to 5°, 35 g. (57%) of crude product, melting at 156.5–187.5° (corr.) is crystallized. Recrystallization from 70 ml. of methanol gives 3.4 g. (55%) of pure 5'-chloro-2-cyano-2'-acetotoluidide melting at 188–189° C. (corr.), which does not depress the melting point of an analytical sample prepared by the alternative method using triethylamine as the hydrogen chloride acceptor.

*Example III*

PREPARATION OF 6'-CHLORO-2-CYANO-3'-ACETOTOLUIDIDE

A solution of phosphorus trichloride (8.8 ml.) in 50 ml. of acetonitrile is added slowly to a cold stirred solution of 2-chloro-5-methylaniline (28.3 g.), triethylamine (41.5 ml.) and cyanoacetic acid (17.0 g.) in 100 ml. of acetonitrile. A vigorous exothermic reaction occurs and a crystalline solid separates during this addition, and it is necessary to cool the flask in ice-water. When all the phosphorus trichloride solution has been added the reaction mixture is heated to boiling and the crystalline solid dissolves to yield a clear solution. The solution is kept at about 90° C. for 1 hour during which time a yellow gummy solid (presumably metaphosphorous acid) separates; this is removed by filtering the hot suspension through diatomaceous earth filter-aid. The filtrate is heated to boiling, 100 ml. of hot water added, cooled slowly to 5° C. and the precipitated crystals collected and dried under reduced pressure (15 mm.) at 50° C. to yield 35.6 g. (85%) of product, melting at 150.5–152.5° (corr.). Recrystallization from 250 ml. of methanol gives 28 g. (67%) of 6'-chloro-2-cyano-3'-acetotoluidide melting at 152–153° C. (corr.).

*Example IV*

PREPARATION OF 3'-CHLORO-2-CYANOACETANILIDE

To m-chloroaniline (5.1 g.) and α-cyanoacetic acid (3.4 g.) is added a solution of the diethyl ethylene pyrophosphite (10.3 g.) in the diethyl phosphite (25 g.). The solution is warmed on a steam-bath for 30 minutes, cooled and 100 ml. of cold water added. A crystalline solid immediately precipitated and this is filtered, washed consecutively with water, sodium bicarbonate solution and water, and finally dried under reduced pressure over calcium chloride to yield 6.8 g. (87%) of crude 3'-chloro-2-cyanoacetanilide, melting point 140.0–140.5° C. (corr.). This product is recrystallized from 210 ml. of 30% ethanol to yield 6.0 g. of pure 3'-chloro-2-cyanoacetanilide, M.P. 139.0–139.5° (corr.), (77%).

*Example V*

PREPARATION OF 2-CYANO-2'-ACETOTOLUIDIDE

The phosphorous pentachloride (42.0 g.) is added to a solution of the α-cyanoacetic acid (17.0 g.) in 200 ml. of anhydrous ether and the mixture stirred at room temperature until a clear solution is obtained (5 minutes). The ether, hydrogen chloride and phosphorous oxychloride are evaporated under reduced pressure (10 mm.) and the residual oil dissolved in 100 ml. of anhydrous benzene. This solution was added dropwise to a solution of the O-toluidine (43.0 g.) in 200 ml. of cold benzene. After 15 minutes the crystalline solid is filtered off, washed thoroughly with cold water and dried to yield 24.8 g. (78%) of crude 2-cyano-2'-acetotoluidide, melting at 130.5–132.5° C. (corr.). Recrystallization from 50% ethanol yielded 23.2 g. (73%) of pure product, melting at 131.5–132° C. (corr.).

*Example VI*

PREPARATION OF 2-CYANO-4'-ACETOANISIDIDE p-Anisidine hydrochloride (48.0 g.) and α-cyanoacetamide (28.1 g.) are intimately ground together in a mortar, the mixture is transferred to a beaker and heated on a hot-plate. A homogeneous melt is obtained at less than 100° C. and no further change is observed until the temperature approached 200° C. when a mild exotherm occurs. The temperature ascends rapidly to about 230° C. and the mixture quickly thickens to a semicrystalline mass. Heating is discontinued immediately upon onset of crystallization and the mixture allowed to cool to room temperature. The solid dark colored product is extracted with 200 ml. of boiling acetone and the crude anisidide is precipitated by drowning the acetone extract in cold water. The crystalline product is washed with cold water and oven-dried at 50° C. to yield 37.7 g. (79%) of crude 2-cyano-4'-acetoanisidide, melting point 131–133° C. (corr.). Recrystallization from 750 ml. of dilute methanol afforded 34.0 g. melting point 133–134° C. (corr.). Recrystallization from 1 liter of chloroform yielded 22.9 g., melting point 135.5–136.5° C. (corr.). A second recrystallization from chloroform (850 ml.) yielded 19.0 g., melting point 135.5–136.5° (corr.).

*Example VII*

PREPARATION OF 4'-CHLORO-2-CYANO-2'-ACETOTOLUIDIDE

In accordance with the procedure described in Example III cyanoacetic acid is reacted with 2-methyl-4-chloroaniline in the presence of triethylamine and phosphorus trichloride to produce 4'-chloro-2-cyano-2'-acetotoluidide.

*Example VIII*

PREPARATION OF 3',5'-DIFLUORO-2-CYANOACETANILIDE

Using the procedure of Example III and reacting cyanoacetic acid with 3,5-difluoroaniline, the compound 3',5'-difluoro-2-cyanoacetanilide is obtained.

*Example IX*

PREPARATION OF 2-CYANO-2'3'-ACETOXYLIDIDE

Following the procedure of Example III and reacting cyanoacetic acid with 2,3-dimethylaniline in the presence of triethylamine and phosphorus trichloride, the product obtained is 2-cyano-2'3'-acetoxylidide.

*Example X*

PREPARATION OF 2-CYANO-2'-FLUOROACETANILIDE

In an experiment using the procedure of Example III and reacting cyanoacetic acid with 2-fluoroaniline in the presence of triethylamine and phosphorus trichloride, the compound 2-cyano-2'-fluoroacetanilide is obtained.

*Example XI*

PREPARATION OF 5'-FLUORO-2-CYANO-2'-ACETOTOLUIDIDE

Using the procedure of Example III and reacting cyanoacetic acid with 2-methyl-5-fluoroaniline in the presence of triethylamine and phosphorus trichloride, the product 5'-fluoro-2-cyano-2-acetotoluidide is obtained.

*Example XII*

PREPARATION OF 2-CYANOPROPIONANILIDE 16.0 g. (0.1 mole) cyanoacetanilide
5.7 g. (0.1 mole) 95% Sod. methylate
14.2 g., 6.3 ml. (0.1 mole) methyliodide Methyl iodide (6.3 ml.) was added to a suspension of cyanoacetanilide (16.0 g.) and sodium methylate (5.7 g.) in 200 ml. of methanol. The mixture was heated under reflux on a water bath and complete solution was obtained at near the B.P. of the mixture. The solution was boiled under reflux for one hour and then distilled to dryness in vacuo. The residue was suspended in 100 ml. of hot water, sufficient methanol (50 ml.) added to effect complete solution and then cooled to 0°. The precipitated crystals were collected and dried in vacuo (1 mm.) at 60° to yield 13.0 g., M.P. 85–125° (corr.), presumably a mixture of cyanoacetanilide and the desired product 2-cyanopropionanilide. A second recrystallization from dilute methanol gave 9.4 g., M.P. 90.5–133°.

*Example XIII*

PREPARATION OF 2-CYANO-3'5'-DIFLUOROACETANILIDE

In accordance with the procedure described in Example III, cyanoacetic acid is reacted with 3,5-difluoroaniline in the presence of triethylamine and phosphorous trichloride to produce 2-cyano-3,5-difluoroacetanilide.

We claim:
1. The compound 3'-chloro-2'-methyl-2-cyanoacetanilide.
2. The compound 5'-chloro-2'-methyl-2-cyanoacetanilide.
3. The compound 3'-chloro-6'-methyl-2-cyanoacetanilide.
4. The compound 2'-chloro-5'-methyl-2-cyanoacetanilide.
5. The compound 2',4'-dichloro-2-cyanoacetanilide.
6. A compound selected from the group consisting of 3' - chloro - 2'-methyl-2-cyanoacetanilide; 5'-chloro-2'-methyl-2-cyanoacetanilide; 3' - chloro-6'-methyl-2-cyanoacetanilide; 2' - chloro-5'-methyl-2-cyanoacetanilide and 2',4'-dichloro-2-cyanoacetanilide.

References Cited in the file of this patent

UNITED STATES PATENTS

| | | |
|---|---|---|
| 2,702,821 | Huebner et al. | Feb. 22, 1955 |
| 2,750,388 | Yale | June 12, 1956 |
| 2,849,369 | Muset | Aug. 26, 1958 |
| 2,888,380 | Brown et al. | May 26, 1959 |

OTHER REFERENCES

Golat et al.: J.A.C.S., volume 65, page 1566 (1943).
Grimmel et al.: J.A.C.S., volume 68, page 439 (1946).
Anderson et al.: J.A.C.S., volume 74, pages 5307–5309 (1952).